US012528036B2

(12) United States Patent
Cowell et al.

(10) Patent No.: US 12,528,036 B2
(45) Date of Patent: Jan. 20, 2026

(54) SWIMMING POOL FILTER DETECTION SYSTEM AND METHOD

(71) Applicant: Pentair Water Pool and Spa, Inc., Cary, NC (US)

(72) Inventors: Jason Cowell, Apex, NC (US); Gerry Callahan, Smithfield, NC (US); Andrew Phy, Cary, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 12 days.

(21) Appl. No.: 18/398,452

(22) Filed: Dec. 28, 2023

(65) Prior Publication Data

US 2025/0214008 A1 Jul. 3, 2025

Related U.S. Application Data

(60) Provisional application No. 63/477,562, filed on Dec. 29, 2022.

(51) Int. Cl.
| | |
|---|---|
| *B01D 35/143* | (2006.01) |
| *B01D 35/26* | (2006.01) |
| *C02F 1/00* | (2023.01) |
| *E04H 4/12* | (2006.01) |
| *G06Q 10/20* | (2023.01) |
| *C02F 103/42* | (2006.01) |
| *G01N 15/08* | (2006.01) |
| *G06Q 30/0601* | (2023.01) |

(52) U.S. Cl.
CPC ......... *B01D 35/1435* (2013.01); *B01D 35/26* (2013.01); *C02F 1/001* (2013.01); *C02F 1/008* (2013.01); *E04H 4/1218* (2013.01); *G06Q 10/20* (2013.01); *B01D 2201/52* (2013.01); *B01D 2201/56* (2013.01); *C02F 2103/42* (2013.01); *C02F 2209/445* (2013.01); *G01N 2015/084* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 9,199,202 | B2 * | 12/2015 | Maggiore | B01D 35/30 |
| 11,025,447 | B2 * | 6/2021 | Ebrom | H04L 12/2818 |
| 11,213,773 | B2 * | 1/2022 | Okoro | G01M 15/02 |
| 2013/0068673 | A1 * | 3/2013 | Maggiore | B01D 35/30 |
| | | | | 210/85 |
| 2014/0277777 | A1 * | 9/2014 | Potucek | E04H 4/148 |
| | | | | 700/282 |
| 2017/0189844 | A1 * | 7/2017 | McLeod | B01D 46/46 |

(Continued)

FOREIGN PATENT DOCUMENTS

AU 2017251809 A1 * 5/2018 ............. B01D 29/21

*Primary Examiner* — Paul S Schwarzenberg
(74) *Attorney, Agent, or Firm* — Husch Blackwell LLP

(57) ABSTRACT

An apparatus and method for filter detection are provided. The filter detection system includes a filter provided in the form of a filter element, a housing surrounding the filter element, and an identification element. A controller is designed to detect the identification element, determine a filter characteristic based on the identification element, determine a remaining lifetime period of the filter element based on the filter characteristic, and provide an alert indicating the remaining lifetime period of the filter element.

19 Claims, 7 Drawing Sheets

(56) References Cited

U.S. PATENT DOCUMENTS

| | | | |
|---|---|---|---|
| 2017/0212484 A1* | 7/2017 | Potucek | H04L 67/10 |
| 2020/0271635 A1* | 8/2020 | Key | G01K 13/02 |
| 2021/0301985 A1* | 9/2021 | Brown | F17D 5/06 |
| 2022/0213709 A1* | 7/2022 | Feeney | E04H 4/1245 |
| 2023/0144546 A1* | 5/2023 | Potucek | A61H 33/0095 |
| | | | 700/282 |

* cited by examiner

400

| Item | Part # | Description |
|---|---|---|
| 1 | 98209800 | High Flow Manual Air Relief Valve |
| 2 | 190058 | Pressure Gauge |
| 3 | 178548 | Lid, 100 sq. ft. Filter |
| 4 | 178546 | Lid, 150, 200 sq. ft. Filter |
| 5 | 59052900 | Lock Ring Assembly |
| 6 | 87300400 | Body O-Ring |
| 7 | 59016200 | Air Bleed Sock Kit |
| 8 | 59053700 | Center Core, 100 sq. ft. Filter |
| 9 | 59053800 | Center Core, 150, 200 sq. ft. Filter |
| 10 | R173215 | Cartridge Element, 100 sq. ft. Filter |
| 11 | R173216 | Cartridge Element, 150 sq. ft. Filter |
| 12 | R173217 | Cartridge Element, 200 sq. ft. Filter |
| 13 | 178731 | Tank Bottom |
| 14 | 154712Z | Drain Cap Assembly (before 10/17) |
| 14 | 190030Z | Drain Cap Assembly (after 10/17) |
| 15 | 178732 | Union Nut "C" Clip |
| 16 | U11-200PS | Union Nut |
| 17 | 178746 | Union Diamond Seal |
| 18 | 178733 | Union, Threaded Half |

FIG. 4

SWIMMING POOL FILTER DETECTION SYSTEM AND METHOD

CROSS-REFERENCE TO RELATED APPLICATIONS

This application claims the benefit of U.S. Provisional Patent Application No. 63/477,562, filed Dec. 29, 2022, entitled SWIMMING POOL FILTER DETECTION SYSTEM AND METHOD, the entire contents of which are incorporated herein by reference.

TECHNICAL FIELD

The present disclosure generally relates to swimming pool filters. More particularly, the disclosure relates to the auto-detection of a filter and/or one or more subcomponents of the filter.

BACKGROUND

A filter is an apparatus for filtering or removing unwanted materials and particles from fluids passing through the filter. Filters are often used to clean the water of aquatic applications such as swimming pools, spas, water features, and other bodies of water.

Conventional filter systems may be provided in the form of a variety of filter types. For example, a filter system may utilize a sand, a diatomaceous earth (DE), a cartridge, a high-efficiency filter, porous media, membranes, hybrid, or combinations thereof. Moreover, each filter type may have multiple models, sizes, and components to accommodate a variety of applications. As such, it may be difficult for a homeowner or maintenance person to identify the filter installed in the system and to understand which parts are applicable and which parts can be utilized for repair. Accurate filter identification is important for determining when maintenance should be performed, what parts may be needed, and determining when the filter should be replaced. Thus, inaccurate filter identification may result in reduced filter performance and an increase in time and cost of maintenance.

Conventionally, when filters are purchased from a manufacturer or vendor, or installed in a pool system, the filters are labeled with information including the name of the manufacturer, a model name, and a size of the filter. However, the current labeling may be difficult to read and may not be easily accessible once the filter is installed in the pool system. For example, it is hard to access this filter information when it is time to repair or replace the filter or parts of the filter.

A user may record, by writing down, the filter information prior to the filter's installation in a pool system; however, the user may easily lose or misplace this information. If the user still has the filter information when it is time for repair of the filter, the user may enter the filter information in a search engine; however, the user may incorrectly enter the information. Additionally, the user may call a local vendor and give the vendor the filter information, but the vendor may not sell the required parts or perform maintenance on the filter type. The user may desire to perform their own maintenance but may not be able to easily find instruction manuals or tutorials. It would be helpful for the user to be able to quickly identify the filter and easily find resources available for the filter. As such, a filter identification element configured to connect a manufacturer, a vendor, a repairman, and/or a user together or provide additional information about the filter may save the user time and effort.

Moreover, after a filter for a pool system is manufactured, the manufacturer (e.g., or a third party) currently has no way to track the filter or its replacement parts as it is sold to a vendor, dealer, pool builder, or a user directly (e.g., a homeowner), and is further sold downstream in the supply chain. In turn, the manufacturer also does not know when a particular filter is installed into a pool system, how long it is used in the pool system, what load is placed on the filter, when the filter should be repaired, and how often the filter is replaced. Therefore, there also is a need for a filter detection system that enables a manufacturer or a third party to automatically track a filter and its component parts through its life cycle and the supply chain.

Therefore, there is a need for a filter detection system that can automatically identify a filter and one or more of its component parts, predict a filter's lifetime, reduce maintenance time and cost, and track its life cycle.

SUMMARY

A filter detection system and method are provided. In one instance, the filter detection system includes a filter comprising a filter element, a housing surrounding the filter element, and a first identification element. A pump is in fluid communication with the filter, and a controller is configured to detect the first identification element, determine a first filter characteristic based on the first identification element, determine a pump run time parameter of the pump, determine a remaining lifetime period of the filter element based on the first filter characteristic and the pump run time, and provide an alert to a third party indicating the remaining lifetime period of the filter element.

In some instances, the first identification element is selected from a group consisting of a QR code, a serial number, or a filter silhouette.

In another instance, the QR code provides a link to at least one of an equipment manual, a list of equipment parts, a digital view of the filter detection system, a warranty registration, an installation guide, a link to reorder parts, or a link to service information.

In another instance, the digital view of the filter detection system is a three-dimensional exploded view of the filter.

In another instance, the three-dimensional exploded view of the filter is viewable in at least one of a mobile application or a virtual reality or augmented reality application.

In another instance, providing the alert to the third party indicating the remaining lifetime period of the filter element includes the step of providing an alert to one or more of a customer, a manufacturer, a vendor, or a service person.

In another instance, the controller is designed to detect a pressure differential across the filter.

In one instance, a method of using a filter detection system in a pool system is disclosed. The method includes the steps of providing a filter having a filter element, a housing surrounding the filter element, and an identification element. The method further includes the steps of providing a pump in fluid communication with the filter, communicatively pairing the filter to a controller via the identification element, communicatively pairing the pump to the controller, providing at least one characteristic of the filter to the controller based on the identification element, determining a runtime of the pump, and determining a filter lifetime based on the at least one characteristic of the filter and the pump runtime.

In another instance, communicatively pairing the filter to the controller via the identification element is accomplished by a user using a user device to scan the identification element.

In another instance, the at least one characteristic of the filter comprises a filter model number, a filter size, a filter type, or a filter age.

In another instance, the controller is configured to upload the number of times a consumer scans the identification element to a database that includes data from one or more customers.

In another instance, the controller is configured to automatically send an alert to a third party when the consumer scans the identification element a minimum number of times in a threshold period.

DESCRIPTION OF THE DRAWINGS

FIG. 4 is a table correlating the filter parts of FIG. 3 to data;

DETAILED DESCRIPTION

Figure 1:
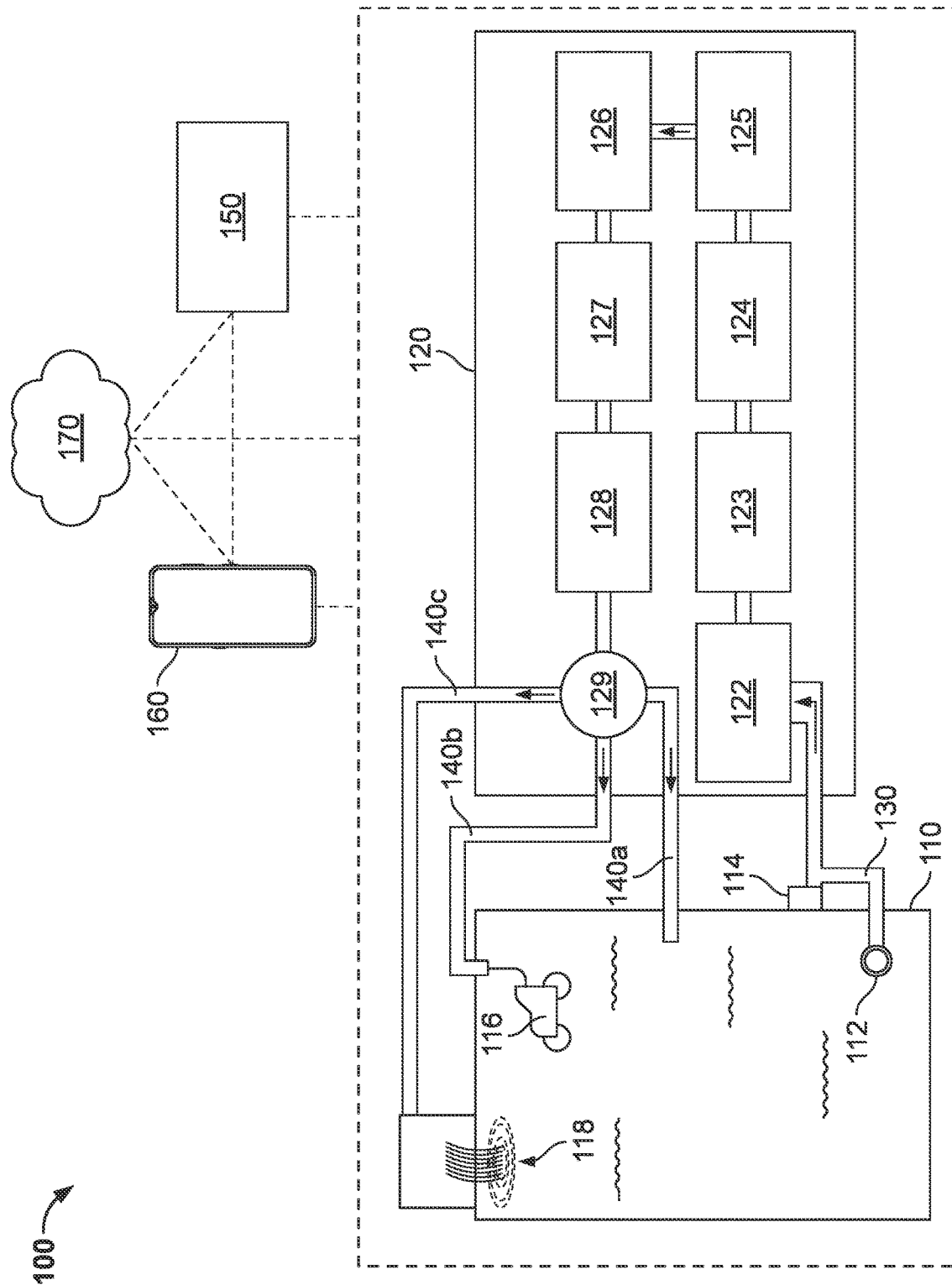
FIG. 1 is a block diagram of an exemplary swimming pool system according to an instance.

Before any instances of the invention are explained in detail, it is to be understood that the invention is not limited in its application to the details of construction and the arrangement of components set forth in the following description or illustrated in the following drawings. The invention is capable of other instances and of being practiced or of being carried out in various ways. Also, it is to be understood that the phraseology and/or terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use instances of the invention. Various modifications to the illustrated instances will be readily apparent to those skilled in the art, and the generic principles herein can be applied to other instances and applications without departing from instances of the invention. Thus, instances of the invention are not intended to be limited to instances shown but are to be accorded the widest scope consistent with the principles and features disclosed herein. The following detailed description is to be read with reference to the figures, in which like elements in different figures have like reference numerals. The figures, which are not necessarily to scale, depict selected instances and are not intended to limit the scope of instances of the invention. Skilled artisans will recognize the examples provided herein have many useful alternatives and fall within the scope of instances of the invention.

FIG. 1 illustrates an exemplary aquatic application, such as a pool or spa system 100 (hereinafter referred to as the pool system 100), according to instances of the disclosure. As shown in FIG. 1, the system 100 comprises a swimming pool 110 and a pool pad 120 designed to retain one or more pool 110 devices. Water may flow from the pool 110, through the pool pad 120 via an inlet pipe 130, and back to the pool 110 from the pool pad 120 via one or more outlet pipes 140a-140c. Thus, a fluid circuit is created.

The inlet pipe 130 may permit water from the pool 110 to flow into the pool pad 120 from a drain 112 positioned in the pool 110. In some instances, the inlet pipe 130 may also permit water to flow from the pool 110 into the pool pad 120 via a skimmer 114. The pool pad 120 can include one or more components in fluid communication with the pool 110. As shown, the pool pad 120 includes a variable speed pump 122, a booster pump 123, a filter 124, a heater 125, a sanitizer 126, a water quality monitor 127, a water chemistry regulator 128, and one or more valves 129. The one or more valves 129 may be connected to one or more outlet pipes returning the pool water to the pool 110. As shown, the pool system 100 includes three outlet pipes 140a-140c. A first outlet pipe 140a functions as a return pipe. A second outlet pipe 140b is connected to a pool cleaner 116. A third outlet pipe 140c is connected to a water feature 118. It is to be understood that the pool 110 and the pool pad 120 may include more or fewer components in a variety of arrangements depending on the specific application and configuration.

Still referring to FIG. 1, the pool system 100 may further include a central controller 150 and a user device 160 that can interface with the controller 150 either directly over a local area network or via a cloud network 170. Although FIG. 1 depicts the controller 150 in communication with the user device 160 and the network 170, it should be noted that various communication methodologies and connections may be implemented to work in conjunction with, or independent from, one or more local controllers associated with one or more individual components associated with the pool system 100 (e.g., a pump controller, a heater controller, etc.) The user device 160 may be a display, a handheld device, tablet, or a mobile device with or without an application.

The filter 124 may be provided in the form of a sand filter, a diatomaceous earth (DE) filter, a cartridge filter, a high-efficiency filter, a hollow fiber membrane filter, hybrid filter, or any other filter designed to filter water in an aquatic application. In one instance, the filter 124 is a sand filter. Sand filters clean water by trapping contaminants in the sand as the water flows through the filter. Although sand filters are cost-effective and easy to use, they may require regular backwashing. In another instance, the filter 124 comprises a DE filter. Similar to sand filters, DE filters work by trapping contaminants in the DE media itself. However, conventionally, media may need to be added to DE filters after each backwash. In another instance, the filter 124 comprises a cartridge filter. Cartridge filters have a relatively high efficiency compared to sand and DE filters. However, cartridge filters may require frequent cleaning and replacement of parts such as the cartridge. In another instance, the filter 124 is a high-efficiency filter, such as a membrane filter. Conventionally, high-efficiency filters are able to remove most contaminates, but also may require the most maintenance.

In a further instance, the filter 124 may be provided in the form of a hybrid filter like the one disclosed in U.S. Pat. Appns. 63/595,700 and Ser. No. 17/934,954, the contents of which are incorporated by reference in their entirety. Further, any of the Clean and Clear Plus Cartridge Filters, Triton Series Filters, FNS Plus Filters, Quad D.E. Filters, System 2 or System 3 Modular Media Filters, Tegelus Top Mount Filters, Sand Dollar Top Mount Filter, Posi-Clear RP Cartridge Filter, SMBW 4000 Series Filters, FullFloXF Filters, EasyClean D.E. Inground Filters, Cristal-Flo Top-Mount Filters, Dynamic Filters, and other filters sold by Pentair Water Pool and Spa (Cary, NC) may be contemplated for use as the filter 124 disclosed herein.

The above filter examples illustrate some of the reasons why it is important for a user to know what type of filter is installed in their pool system and further why it is important for a manufacturer or a third party (such as a vendor or service person) to be able to know what type of filter is installed and/or track a filter and/or its component parts from manufacturing through installation in a pool system and continue tracking the filter during use, repair, and/or replacement of the filter or any of its associated components. Knowing the type of filter and/or tracking the filter may save time and cost when the filter is due for repair, maintenance, or replacement. When used throughout the disclosure, one skilled in the art will recognize that "vendor" can include, but is not limited to, a third party capable of providing service, parts, and/or technician(s) and/or a dealer(s) to assist a user in the repair or replacement of system components or routine maintenance.

Figure 2:
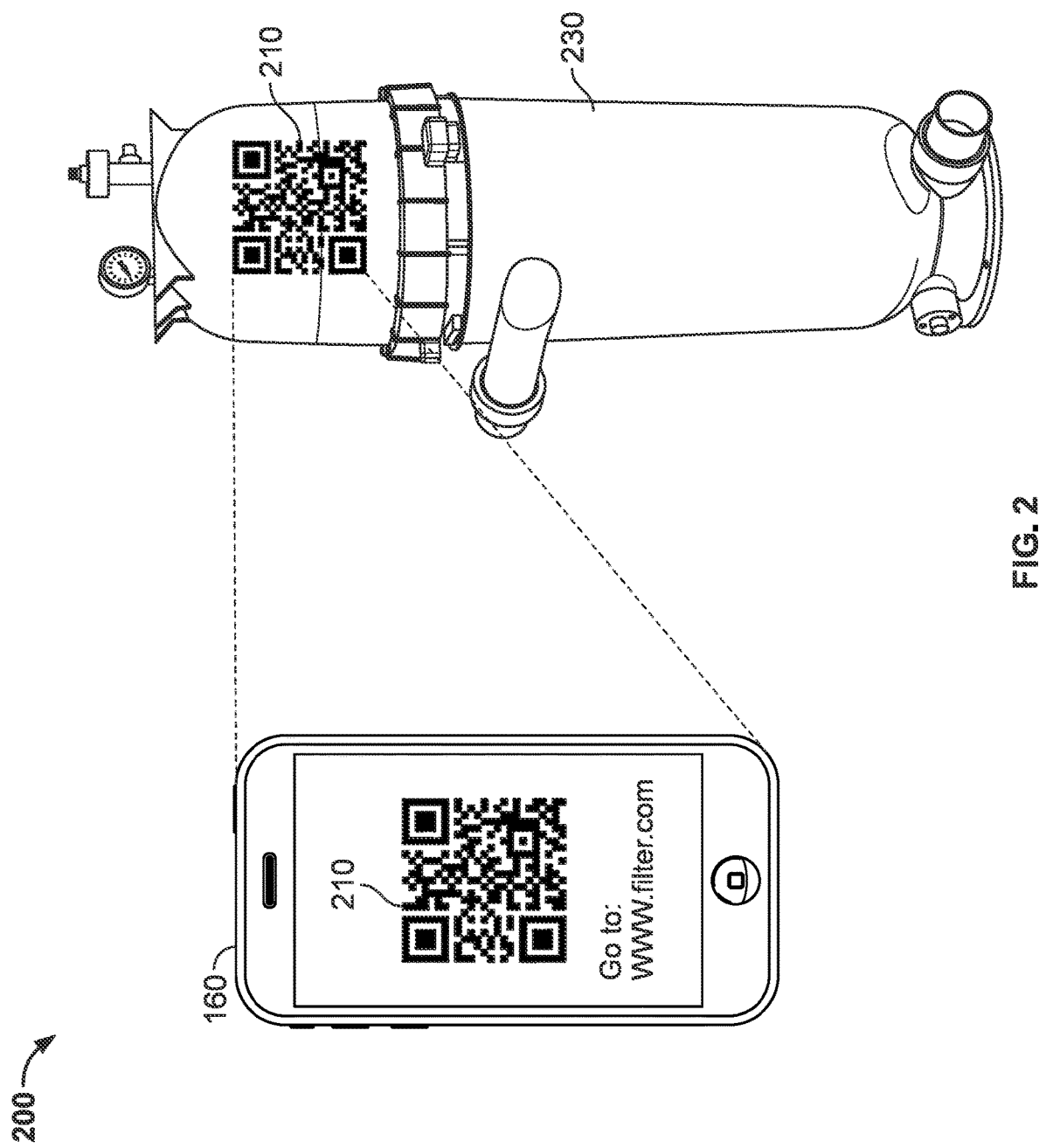
FIG. 2 illustrates an exemplary filter and a method of filter detection according to an instance.

Turning to FIG. 2, any of the filters 124 disclosed herein may be provided as a filter 200 having a housing 230 with an identification element 210 associated therewith. In some instances, the filter 200 may be provided with a plurality of identification elements 210. If the filter 200 has a first identification element and a second identification element, the first identification element and the second identification element may work together, or separately, to provide the user and/or a third party with information regarding the filter 200, the filter parts, and/or the pool system 100. For example, the first identification element may contain or be associated with filter data (e.g., the manufacturer or the type of filter), and the second identification element may contain or be associated with user data (e.g., the name or the address of the user). By way of another example, the first identification element may be associated with the filter operational data and/or manufacturer information, and the second identification element may be associated with a specific individual component of the filter 200 (e.g., the filter membrane, the cartridge, or other filtration element). Both the first identification element and the second identification elements may be in communication with the controller 150. Further, one, two, three, or more identification elements may be included or otherwise associated with the filter 200 (e.g., associated with the filter itself, included in the product packaging, etc.).

As discussed above, pool systems may use various filters, each with unique components and maintenance needs. However, it may be difficult for a person to determine the filter type or other associated information, such as the filter size or length of use, by merely looking at the filter. Therefore, by providing an identification element 210 disposed on, in communication with, or near the filter 200, or on any of its associated parts, the parts and/or maintenance needs of the filter 200 may be easily detected, tracked, quickly identified, and/or auto-identified. In one instance, other pool pad devices of the pool system 100 also may be tracked or identified with the identification element 210.

In one instance, the identification element 210 is provided on or near (e.g., an exterior of) the housing 230 of the filter 200. In another instance, the identification element 210 may be disposed on the housing 230 of the filter 200 directly, or near the housing 230 of the filter 200, such as on the filter packaging, a pipe, a plaque, or other nearby structure (not shown) accessible to the user. Further, the identification element 210 may be assigned, installed, and/or provided by a manufacturer, a vendor, a maintenance person, or a user of the filter (e.g., a homeowner), and/or a third party.

As shown, the identification element 210 may be permanently coupled to or removably coupled to the filter 200. It is understood that the identification element 210 may be disposed or affixed on or near the filter 200 in another manner, such as by printing, engraving, or embossing.

The identification element 210 may be provided in the form of a quick response (QR) code. However, it is to be understood that the identification element 210 may be provided in the form of one or more of a serial number, a symbol, an image of the filter, a filter silhouette, a barcode, a picture, and/or other identification elements. In some examples, the identification element 210 may be provided in the form of a near field communication (NFC) tag, a data matrix, a Snaptag, and/or a radio frequency identification (RFID) tag.

Additionally, in one instance, the identification element 210 may be pre-configured with data provided in the form of a name, number, device (e.g., filter) type, manufacturer, serial number, identification details, or model type. In other instances, the identification element 210 may be pre-configured with data, such as user (e.g., homeowner) data containing the user's name, address, make, and/or model of the user's pool system. In other instances, the identification element 210, rather than being pre-configured with data, may later be associated with user data or filter data, as discussed hereinbelow. For example, the identification element 210 may be associated with user data or filter data after the identification element 210 is scanned.

To use the identification element 210, a user (e.g., a homeowner, a maintenance person, or a vendor) may use the user device 160 comprising a data capture element (e.g., a camera, a microphone, a sensor, and/or any combination thereof) to recognize or scan the identification element 210. In one instance, the identification element 210 is scanned without removing the filter 200 from the pool system 100. In a further instance, the user may type the serial number in, or otherwise hold the user device 160 adjacent to the identification element 160 to read the information. It should be appreciated that various communication methodologies may allow the user device 160 to read the identification element 210 including, for example, near field communication, RFID, Bluetooth, UWB, Wi-Fi, and the like.

When the user device 160 recognizes the identification element 210, the user may be directed to an application such as a smartphone or mobile application, a third party website, or advanced vision technologies like virtual reality, augmented reality, smart glasses, cameras, or similar technologies.

In one instance, the application may be in communication with the network 170 of FIG. 1. In another instance, the application may be located on the network 170. The application may contain information about the filter 200 (e.g., filter data), such as a filter type/name, a model number, a user manual, a warranty registration, maintenance tips, an installation guide, information on reordering parts, service information, and/or the like. The application further may contain information about the parts of the filter 200 or the other components of the pool system 100. In other instances, the application may contain information about the user (e.g., user data), such as a homeowner, and/or information about the user's pool system 100, such as the user's name, address, make, and/or model of the user's pool system.

In some instances, the application further is associated with a customer account. Once the user scans the identification element 210, the information about the filter 200, one or more parts of the filter, and/or the filter type may be automatically uploaded to the customer account. Thus, the user may access information about the filter 200, such as the model and/or the part list 400, without having the scan the identification element 210 again.

Figure 3:
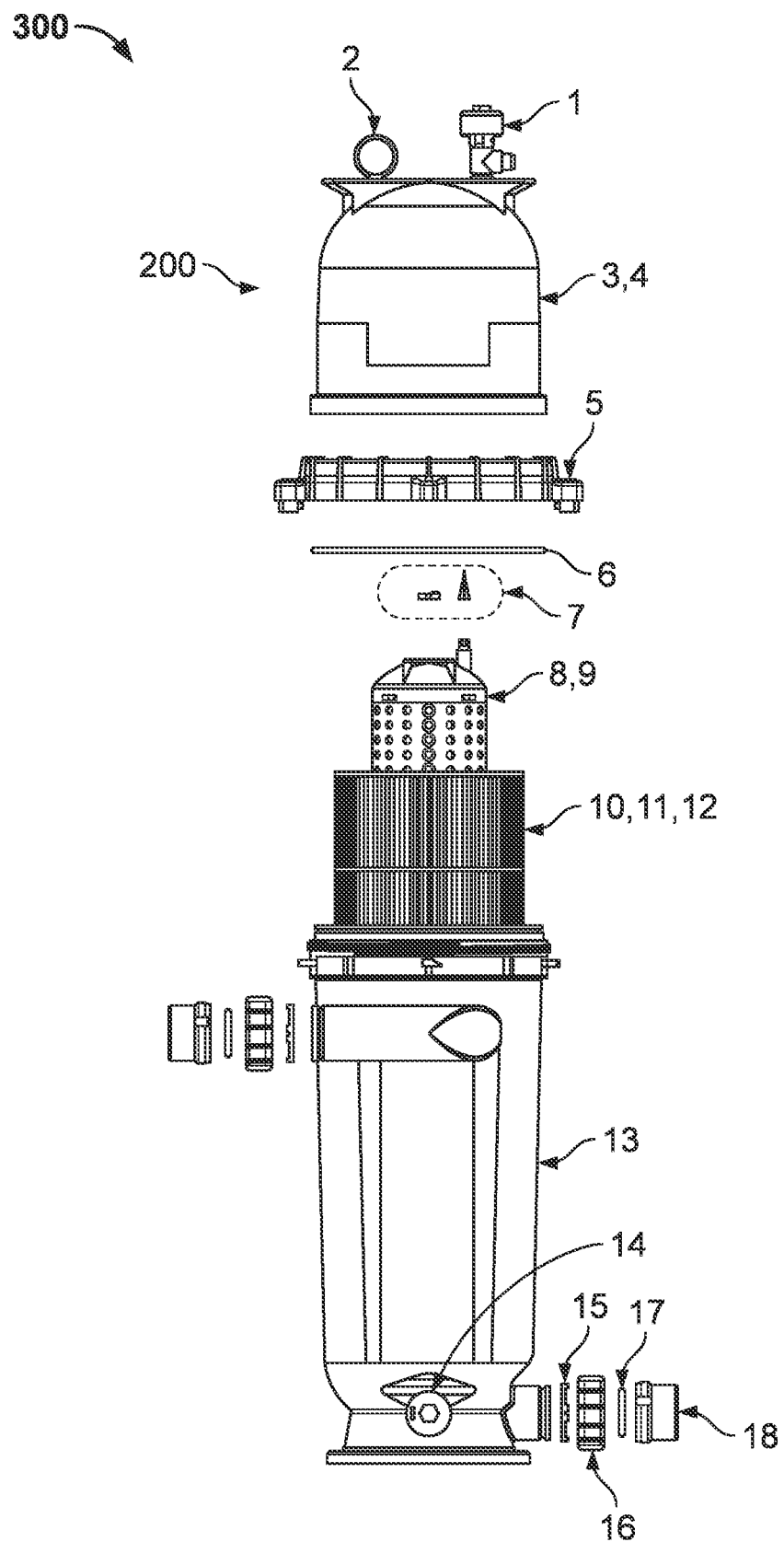
FIG. 3 is an exploded view of the filter of FIG. 2 provided in the form of various filter parts and associated item numbers.

Additionally, the identification element 210 and/or the application may provide a link to at least one of an exploded view of the filter 200 (as shown in FIG. 3), an equipment manual, a list of equipment parts, a digital view of the filter detection system, a warranty registration, warranty information, an installation guide, a link or list to reorder parts, a link or list of service information, a link to the manufacturer, a link or list of potential repairman, a link to a vendor or dealer, or the like.

Turning to FIG. 3, a model 300 illustrating an exploded view of the filter 200 may be accessed through the application. The model 300 may comprise all or some of the filter parts of the filter 200. As shown, the filter parts may be labeled (e.g., 1 through 18) with one or more item numbers or other text or pictures.

The identification element 210 and/or the model 300 may also be linked to a data set, such as a part list 400, as shown in FIG. 4. The data set may be stored in the controller 150 or on the network 170.

The part list 400 may contain information on specific filter components identified in the model 300. The part list 400 may match the item numbers of the model 300 to a part number and a description of the filter component. In some instances, the model 300 and part list 400 may be displayed in any format, such as concurrently, side by side, or in other ways to consolidate the provided information.

In some instances, the part list 400 may contain more or less information. For example, the part list 400 may comprise one or more hyperlinks (not shown) directing the user to re-ordering information, maintenance information, installation information, informational videos, at least one vendor's website, the manufacturer's website, or other similar information. In another instance, the model 300 and/or the part list 400 may be accessible through an augmented or virtual reality application. For example, portions of the model 300 and/or the part list 400 may be overlaid onto an augmented or virtual image of the filter 200, and hyperlinks may still be available to the user.

Referring back to FIG. 1, the user device 160 may be in communication with the controller 150. The controller 150 may be configured to track and store user data, filter data, and/or upload the filter data or user data to the network 170 and/or a third party network. The third party network may be provided as a separate network (not shown) in communication with the network 170. For example, the third party network may be the manufacturer's network or a vendor's network.

The filter data or user data may be provided in the form of one or more of model number, size or capacity, volume, parts list, coverage or protection information, installation information, configuration information, geographic location, date installed, recommended maintenance procedures and timelines, normal operating thresholds, error/warning codes, the filter type, parts of the filter, filter location data size of the pool 110, components of the pool system 100, components of the pool pad 120, filter operational data (e.g., run time of the filter, how often the filter is backwashed, the load on the filter, or the like), and/or maintenance data (such as repair and/or replacement of the filter 200 and/or the parts of the filter 200) for one or more components of the pool pad 120, number of times the user scans the identification element 210, number of times the user accesses the application, what information on the application the user is looking at, and similar information.

Sharing of the filter data and/or the user data from the network 170 with a third party network may save time and cost (e.g., for maintenance, repair, and/or replacement of the filter, the filter components, or other components of the system 100). In one instance, the controller 150, the network 170, and/or the third party network may enable the manufacturer or vendor, through the use of the identification code 210, to track the filter 200 through the supply chain. For example, the manufacturer may start tracking the filter 200 (or one of its subcomponents) at production by conducting a first scan of the identification element 210, track the filter 200 as it is provided to a vendor or reseller via a second scan of the identification element 210, and further track the filter 200 to a user (e.g., pool owner or homeowner) via a third scan of the identification element 210 when the filter 200 is installed into the pool system 100.

The use of the identification element 210 also may enable the manufacturer or the vendor to track the use, maintenance, and/or replacement of the filter 200 (e.g., additional scans of the identification element 210). The identification element 210 further may enable the tracking of individual components or parts via an identification element 210 being associated with the specific part (e.g., a filter membrane, a filter housing, etc.). Further, the identification element 210 may be used to track other pool components in the pool system 100 that are associated with the filter 200, such as the variable speed pump 122 and/or the booster pump 123. Tracking the filter 200 may create a data trail for the user, manufacturer, and/or vendor to refer to at a later time to understand the history of the filter 200.

Moreover, the controller 150, via the application, may be designed to send a notification (e.g., an alert or a signal). The notification may notify a manufacturer and/or a vendor that the identification element 210 has been scanned. Once the manufacturer or vendor is notified, a record, associated with the filter 200 and/or the user, may be generated for later reference or monitoring.

Figure 5:
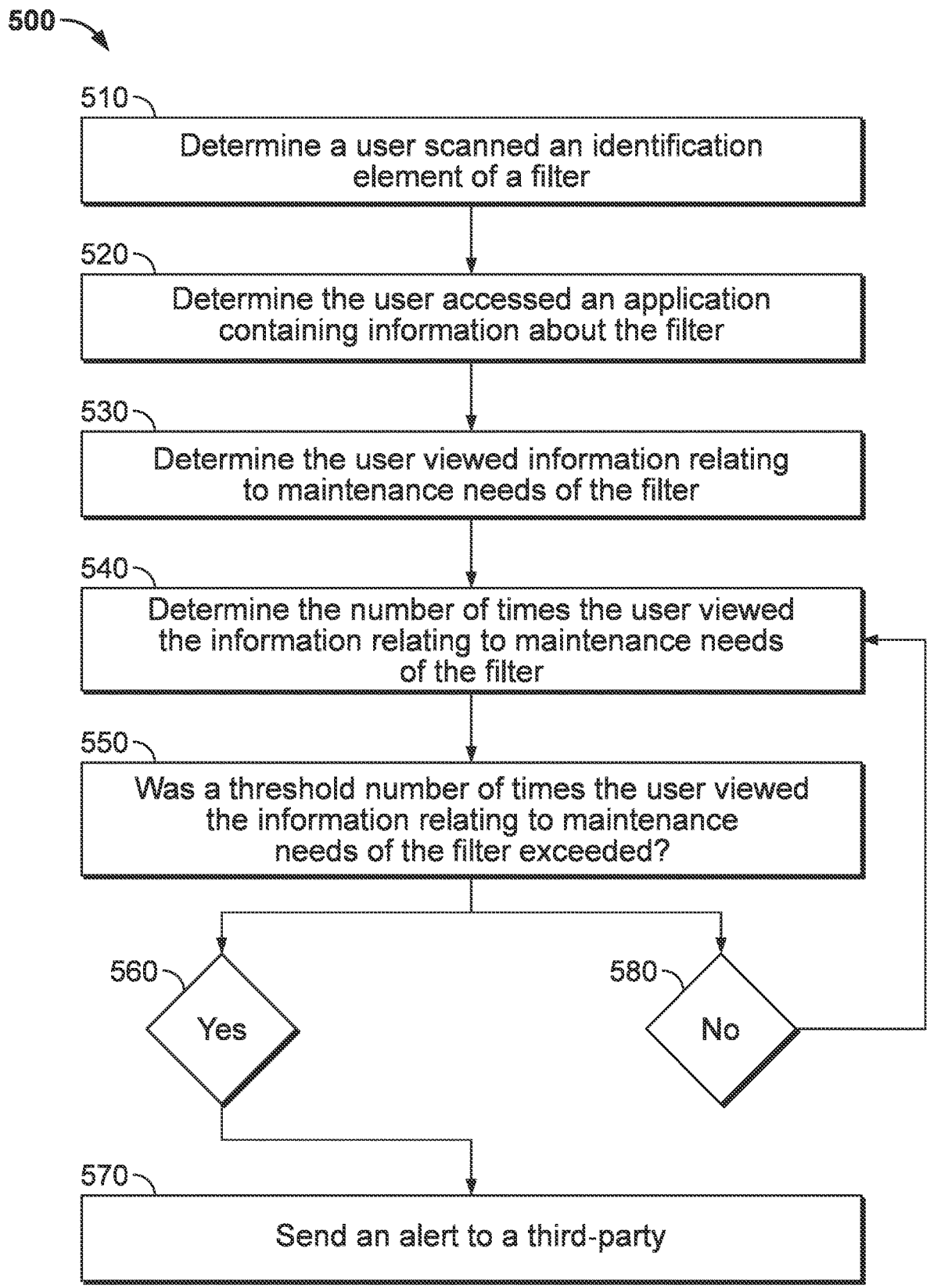
FIG. 5 is a schematic diagram of a method of alerting a service company that a filter requires maintenance.
Figure 6:
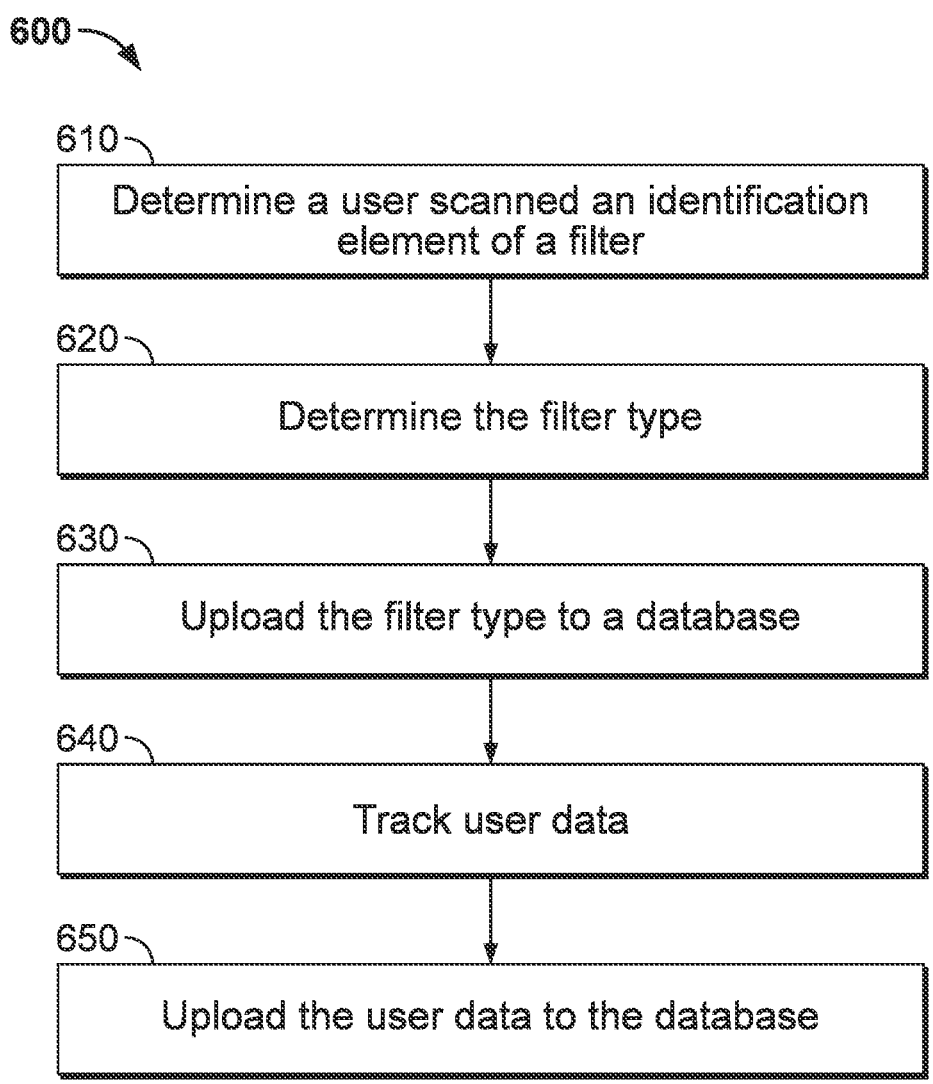
FIG. 6 is a method of tracking information related to a filter according to an instance.
Figure 7:
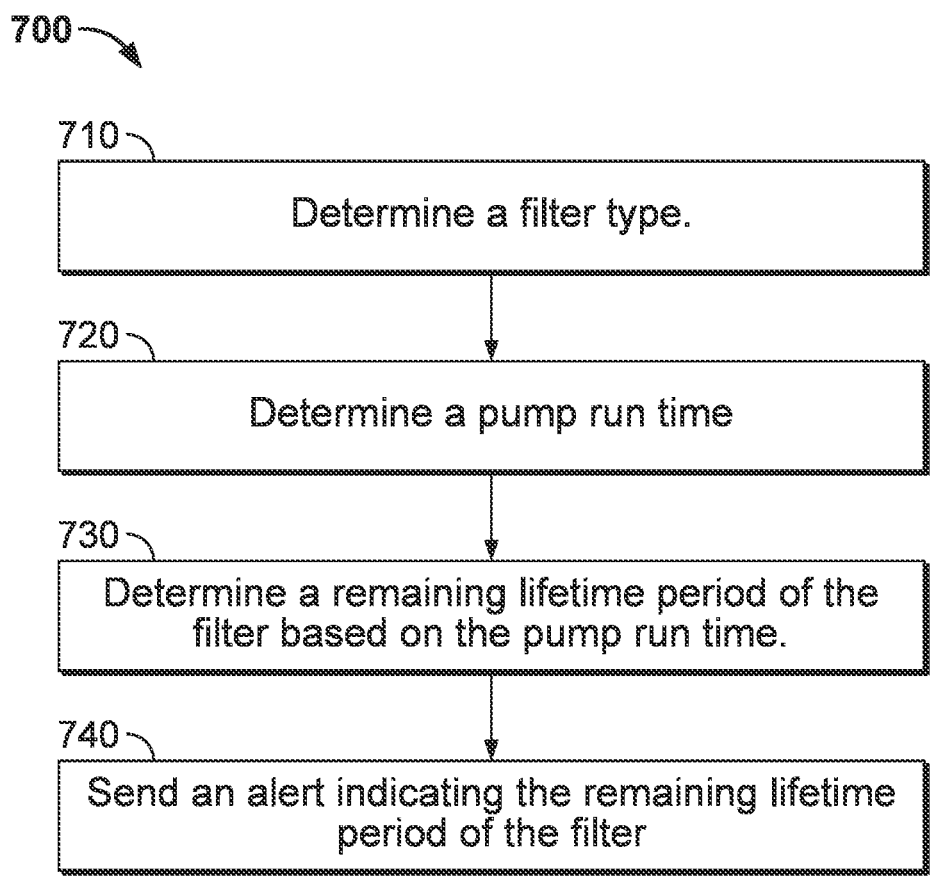
FIG. 7 is a method of determining a filter lifetime according to an instance.

FIGS. 5-7 illustrate various methods of how the user, or a third party may utilize the user data. FIG. 5 illustrates an instance of a method 500 for alerting a homeowner, a service or maintenance company, or other third party that the filter 200 requires maintenance or replacement.

At block 510, the controller 150 determines a user (e.g., a homeowner, a vendor, and/or a maintenance company) has scanned the identification element 210. As shown, in FIG. 1, the controller 150 may be in communication with the user device 160 and/or the network 170. Thus, the controller 150 may determine the user has scanned the identification element 210 by receiving an alert from the user device 160 and/or the network 170.

At block 520, the controller 150 determines the user has accessed an application containing information about the filter 200. As discussed above, the user may be directed to an application containing information about the filter 200 by scanning the identification element 210 of the filter 200 or may access the application by using stored data.

At block 530, the controller 150 determines the user has viewed information relating to operational or maintenance parameters of the filter 200. For example, as shown in FIGS. 3 and 4, in one instance, the user may access the model 300 and the part list 400 indicating the user may need to re-order a component of the filter 200. In another instance, the user may access a maintenance tutorial video, indicating the user is trying to perform maintenance on the filter. In yet another instance, a user may access information on location and contact information for local service companies indicating the user is trying to find a service person.

At block 540, the controller 150 determines the number of times the user has viewed the information relating to maintenance needs of the filter 200. The number of times the user has viewed the information relating to maintenance needs of the filter 200 may be stored in a first ledger of the controller 150 and/or on a second ledger maintained on the network 170, wherein the controller 150 may access the first ledger and/or the second ledger.

At block 550, the controller 150 determines if the number of times the user viewed the information relating to maintenance needs of the filter has exceeded a threshold. For example, if a user accesses the information relating to maintenance needs of the filter twice in a one-week period, the threshold may be exceeded. The frequency at which the user accesses the information relating to maintenance needs of the filter may be an indication that the filter needs to be serviced.

At block 560, the controller determines the threshold has been exceeded. Thus, at block 570, the controller sends an alert to a third party, such as a maintenance company, that the filter may require maintenance. The third party may then contact the user to schedule maintenance, help the user re-order parts, troubleshoot problems with the filter, and the like.

Alternatively, at block 580, the controller determines the threshold has not been exceeded. The controller 150 then returns to block 540 and continues to track the number of times the user accesses information relating to the maintenance needs of the filter.

FIG. 6 illustrates an instance of a method 600 for tracking information related to the filter 200. Similar to block 510 of method 500, at block 610, the controller 150 determines a user has scanned the identification element 210. As shown in FIG. 1, the controller 150 may be in communication with the user device 160 and/or the network 170. Thus, the controller 150 may determine the user has scanned the identification element 210 by receiving an alert or signal from the user device 160 and/or the network 170.

At block 620, the controller 150 determines the filter type or other information about the filter. In one instance, the controller 150 is configured to determine the filter type and/or the parts of the filter based on the identification element 210. In another instance, the controller 150 is configured to determine the filter type by retrieving the information from the user device 160 and/or the network 170 where the information is stored.

At block 630, the controller 150 uploads the filter type to a database. The database may be a third party database. In one instance, the database is located on the network 170. The database may contain information from multiple users.

At block 640, the controller 150 is configured to track user or filter data. The user or filter data may be provided in the form of at least one of location data, size of the pool 110, components of the pool 110, components of the pool pad 120, operational and/or maintenance data (e.g., repair and/or replacement of the filter 200 and/or the parts of the filter 200) for one or more components of the pool pad 120, number of times the user scans the identification element 210, number of times the user accesses the application, what information on the application the user is looking at, and the like.

At block 650, the controller 150 is configured to upload the user or filter data to the database. The third party may use the user or filter data from one or more users in the database to predict maintenance needs for one or more users. For example, in one instance, the third party may analyze the data and determine that multiple users with the same cartridge filter have ordered a replacement cartridge. Thus, the third party may contact other users with the same cartridge filter and alert them that it may be time to replace their cartridge. For example, if multiple users with the same filter cartridge order a replacement cartridge about once every three months, then the third party may alert other users with the same cartridge filter about every three months that it is time to replace the cartridge filter. Further, the third party also may alert vendors that sell the cartridge filter, such that the vendor may contact the user(s) with a reminder that it is time to service or replace the cartridge filter.

FIG. 7 illustrates an instance of a method 700 for determining one or more of a filter lifetime that may be used to predict when a filter may need maintenance, a filter part replaced, a backwash or other cleaning operation, or other maintenance operation. At block 710, the controller 150 is configured to determine a filter type. The controller 150 may determine the filter type by any of the methods discussed above, such as by using the identification element 210.

At block 720, the controller 150 is configured to determine a pump run time. The pump may be the variable speed pump 122 or the booster pump 123 of FIG. 1. The pump may comprise a local controller in communication with the controller 150.

At block 730, the controller 150 is configured to determine a remaining lifetime period of the filter based on the pump run time. The pump run time may provide an estimated filter lifetime based on manufacturing data and historical data. For example, in one instance, the filter may be rated to clean a specified amount of water over its lifetime. Thus, by determining how long the pump has been running, the amount of water the filter has cleaned can be calculated. In another instance, historical data for the filter type may indicate the filter lifetime. For example, the filter may be located in a pool system that is frequently used. Therefore, the pool system may have a high level of contaminants in the water. Thus, the filter may have a shorter life than the lifetime estimated by the manufacturer, as indicated by historical data. Moreover, the life of the filter may also depend on pump speed and loading of the filter and the duration of a load on the filter before cleaning the filter. Such that a more loaded filter will create more stress on the filter and may push of pleats or membranes of a filter harder than when the filter has less or no load. In a further instance, pressure data from the filter and the pump speed may indicate when the filter needs to be cleaned and/or when it may need to be replaced.

In addition to using the runtime of the pump to determine the remaining lifetime period of the filter, the pool system 100 and/or the controller 150 in some instances can execute an iteratively trained training module to generate information, such as the remaining life of the filter or when maintenance of the filter may be useful. In some instances, the controller 150 may be designed to train a training module at block 730 before running the iteratively trained training module. In some embodiments, the training process can be designed to perform various advanced data analysis and modeling processes. In one example, the training process can be designed to generate and iteratively train one or more training modules for providing customized recommendations for filter maintenance or filter replacement to improve the overall performance of the filter 200 and/or the pool system 100. In some embodiments, the training process can be designed to generate and iteratively train or more training modules to provide a dynamic diagnostic, notification, deployment, and service request to third parties, such as vendors, who can provide service (e.g., filter replacement or repair) to a user's pool system 100 and/or the filter 200 according to the output of the module. For example, the training process can be designed to generate, train, and execute nodes, neural networks, gradient boosting algorithms, mutual information classifiers, random forest classifications, and other machine learning and artificial intelligence-related algorithms.

At block 740, the controller 150 is configured to send an alert indicating the remaining lifetime period of the filter. In one instance, the alert is sent to a user. In another instance, the alert is sent to a third party, such as a vendor or a manufacturer. When the user or the third party receives the alert, they may be prompted to place an order for a replacement filter. In other instances, when the alert (e.g., that the filter has little to no remaining lifetime period left) is sent to the user or the third party, a new filter may be automatically ordered from a manufacturer or a vendor.

In some instances, the controller 150 may include a training module designed to execute programmable instructions related to one or more advanced data analysis and modeling processes. In some embodiments, the training module may generate and iteratively train training modules for providing dynamic outputs. For example, in some embodiments, the training module may be configured to perform one or more of the several comparing and determining steps of the processes shown and described in connection with FIGS. 5-7. The training module may be configured to generate, train, and execute one or more nodes, neural networks, gradient boosting algorithms, mutual information classifiers, random forest classifications, and other machine learning and artificial intelligence-related algorithms.

In some embodiments, the training module may analyze one or more parameters in the process of iteratively training a learning model or similar advanced training model. When used throughout the present disclosure, one skilled in the art will understand that processes for an "iteratively trained learning model" may include machine learning processes and other similar advanced artificial intelligence processes. For example, the system and processes of the present disclosure may perform automatic configuration and re-configuration of system components (e.g., the filter), system or component updates, settings or features of the system components, diagnostics, and similar processes. In some embodiments, the training module may use additional inputs and/or feedback loops for an iterative training process.

The controller 150 may further include an advanced analytics module designed to execute additional data processing techniques and steps, including report generation, troubleshooting, generating customized user display content and/or recommendations according to user data settings and preferences, predictive analytics, historical data, usage data, and other analytics. The advanced analytics module can also be used for relationship-handling processes including automated reminders, scheduling, feedback, and other data processing tasks.

It will be appreciated by those skilled in the art that while the invention has been described above in connection with particular instances and examples, the invention is not necessarily so limited and that numerous other instances, examples, uses, modifications, and departures from the instances, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of determining a filter lifetime for a swimming pool system, comprising:
   providing a filter having
      a filter element,
      a housing surrounding the filter element, and
      an identification element associated with either the housing or the filter element;
   providing a pump in fluid communication with the filter;
   communicatively pairing the filter to a controller via the identification element;
   communicatively pairing the pump to the controller;
   providing at least one characteristic of the filter to the controller based on the identification element;
   determining a runtime of the pump; and
   determining a filter lifetime based on the at least one characteristic of the filter and the runtime of the pump.

2. The method of claim 1, wherein communicatively pairing the filter to the controller via the identification element is accomplished using a user device to scan the identification element.

3. The method of claim 1, wherein the at least one characteristic of the filter comprises a filter model number, a filter manufacturer, a filter size, a filter type, or a filter age.

4. The method of claim 1, wherein the controller is configured to store a number of times the identification element communicates with the controller during a threshold period.

5. The method of claim 4, wherein the controller is configured to upload the number of times the identification element communicates with the controller to a database, wherein the database includes a data set from one or more users of the swimming pool system.

6. The method of claim 5, wherein the controller is configured to upload the filter lifetime to the database.

7. The method of claim 1 further comprises the step of alerting a user or a third party via a user device of the filter lifetime remaining.

8. A swimming pool filter detection system, comprising:
   a filter provided in the form of a housing with a filter element therein, and an identification element associated with the filter, the filter being defined by a filter characteristic;
   a pump in fluid communication with the filter; and
   a controller configured to:
      detect the identification element,
      determine the filter characteristic based on the identification element,
      determine a pump run time parameter of the pump,
      determine a remaining lifetime of the filter element based on the filter characteristic and the pump run time parameter, and provide an alert indicating the remaining lifetime of the filter element.

9. The filter detection system of claim 8, wherein the identification element is selected from at least one of a QR code, a serial number, or a filter silhouette.

10. The filter detection system of claim 9, wherein, when the identification element is a QR code, the QR code provides access to at least one of an equipment manual, a list of equipment parts, a digital view of the filter detection system, a warranty registration, an installation guide, a parts ordering system, or to information about service or maintenance.

11. The filter detection system of claim 10, wherein, when the identification element is a QR code, the QR code is pre-configured with user data provided in the form of a name, contact information, a filter element type, a manufacturer, an address, or a filter model type.

12. The filter detection system of claim 10, wherein, when the identification element is a digital view code, the digital view is provided as a three-dimensional exploded view of the filter.

13. The filter detection system of claim 12, wherein the three-dimensional exploded view is viewable in at least one of a mobile application or a virtual reality application.

14. The filter detection system of claim 8, wherein providing the alert indicating the remaining lifetime of the filter element is provided to at least one of a user, a manufacturer, a vendor, a dealer, or a service person.

15. The filter detection system of claim 8, wherein the controller is configured to detect a pressure differential across the filter.

16. A method of using a filter detection system for a pool system, comprising:
   providing a pump, a filter in the form of a filter element, a housing surrounding the filter element, and an identification element associated with a component part of the filter;
   scanning the identification element via a user device to pair the filter to a controller via the identification element;
   providing at least one characteristic of the component part of the filter to the controller based on the identification element;
   determining a run time of the pump;
   determining a remaining lifetime of the filter based on the run time of the pump and the at least one characteristic of the component part; and
   based on the remaining lifetime of the filter, providing a signal from the controller to a third party that the identification element has been scanned.

17. The method of claim 16, wherein a user scans the identification element without having to remove the filter from the pool system.

18. The method of claim 16, wherein the third party is at least one of a vendor or a manufacturer.

19. The method of claim 16, wherein providing the signal includes providing an alert to the third party that the filter element requires repair or automatically places an order for the component part of the filter.

\* \* \* \* \*